(12) United States Patent
Iwamura et al.

(10) Patent No.: US 8,208,445 B2
(45) Date of Patent: Jun. 26, 2012

(54) MOBILE STATION AND MOBILE COMMUNICATION METHOD

(75) Inventors: Mikio Iwamura, Yokohama (JP); Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/126,882

(22) PCT Filed: Oct. 28, 2009

(86) PCT No.: PCT/JP2009/068493
§ 371 (c)(1),
(2), (4) Date: Jul. 8, 2011

(87) PCT Pub. No.: WO2010/050503
PCT Pub. Date: May 6, 2010

(65) Prior Publication Data
US 2011/0255508 A1 Oct. 20, 2011

(30) Foreign Application Priority Data
Oct. 31, 2008 (JP) .................................. 2008-282593

(51) Int. Cl.
*H04W 4/00* (2009.01)
*H04W 36/00* (2009.01)
(52) U.S. Cl. ........................................ 370/331; 455/436
(58) Field of Classification Search ........................ None
See application file for complete search history.

(56) References Cited

FOREIGN PATENT DOCUMENTS
JP 2008-259057 A 10/2008

OTHER PUBLICATIONS

International Search Report w/translation from PCT/JP2009/068493 dated Feb. 2, 2010 (2 pages).
Written Opinion w/translation from PCT/JP2009/068493 dated Feb. 2, 2010 (7 pages).
3GPP TS 36.331 V8.3.0; "3rd Generation Partnership Project; Technical Specification Group Access Network; Evolved Universal Terrestrial Radio Acces (E-UTRA) Radio Resource Control (RRC); Protocol specification (Release 8)"; Sep. 2008 (178 pages).
TSG-RAN WG2 Meeting #62, R2-082125; "Summary of the Continued Discussion on L1 Parameter Handling in Dedicated Signaling"; Ericsson; Kansas City, USA; May 5-9, 2008 (1 page).
3GPP TSG RAN WG2#63bis, R2-085096; "Clarification on Connected UE Behavior for Handling System Information"; Panasonic; Prague, Czech; Sep. 29-Oct. 3, 2008 (5 pages).

*Primary Examiner* — Clemence Han
(74) *Attorney, Agent, or Firm* — Osha Liang LLP

(57) ABSTRACT

A mobile station according to the present invention includes: a communication unit (14) configured to start a first communication using information included in a MIB, a SIB 1 and handover command in a handover-target cell when a broadcast information reception unit (12) succeeds in receiving the SIB 1, and to perform a second communication using information included in the MIB and the handover command in the handover-target cell when the broadcast information reception unit (12) fails to receive the SIB 1.

6 Claims, 10 Drawing Sheets

FIG. 3

```
MasterInformationBlock ::=    SEQUENCE {
    dl-SystemBandwidth           ENUMERATED { n6, n15, n25, n50, n75, n100, spare10,
                                              spare9, spare8, spare7, spare6, spare5,
                                              spare4, spare3, spare2, spare1 },
    phich-Configuration          PHICH-Configuration,
    systemFrameNumber            BIT STRING (SIZE (8)),
    spare                        BIT STRING (SIZE (1)) }
}
```

FIG. 4

```
SystemInformationBlockType1 ::=    SEQUENCE {
    cellAccessRelatedInformation    SEQUENCE {
        plmn-IdentityList               PLMN-IdentityList,
        trackingAreaCode                TrackingAreaCode,
        cellIdentity                    CellIdentity,
        cellBarred                      ENUMERATED {barred, notBarred},
        intraFrequencyCellReselection   BOOLEAN                             OPTIONAL,  -- Cond CellBarred
        cellReservationExtension        ENUMERATED {reserved, notReserved},
        csg-Indication                  BOOLEAN
    },
    cellSelectionInfo               SEQUENCE {
        q-RxLevMin                      INTEGER (-70..-22),
        q-RxLevMinOffset                INTEGER (1..8)                      OPTIONAL   -- Need OP, value
    range FFS
    },
    pmax                            Pmax                                    OPTIONAL,  -- need FFS
    frequencyBandIndicator          INTEGER (1..64)                                    -- need OP
    schedulingInformation           SchedulingInformation,
    tdd-Configuration               TDD-Configuration,
    si-WindowLength                 ENUMERATED {                            OPTIONAL,  -- Need OD
                                        ms1, ms2, ms5, ms10, ms15, ms20,
                                        ms40, spare1},
    systemInformationValueTag       INTEGER (0..31)
    nonCriticalExtension            SEQUENCE {}                             OPTIONAL   -- Need OP
}

PLMN-IdentityList ::=   SEQUENCE ( SIZE (1..6) ) OF SEQUENCE {
    plmn-Identity                   PLMN-Identity,
    cellReservedForOperatorUse      ENUMERATED {reserved, notReserved}
}

SchedulingInformation ::= SEQUENCE ( SIZE (1..maxSI-Massage) ) OF SEQUENCE {
    si-periodicity                  ENUMERATED {
                                        rf8, rf16, rf32, rf64, rf128, rf256, rf512,
                                        spare1,...},
    sib-MappingInfo                 SIB-MappingInfo
}

SIB-MappingInfo ::= SEQUENCE ( SIZE (0..maxSIB-1) ) OF SIB-Type
```

FIG. 5

```
SystemInformationBlockType2 ::=    SEQUENCE {
  accessBarringInformation         SEQUENCE {
    accessBarringForEmergencyCalls   BOOLEAN,
    accessBarringForSignalling       AccessClassBarringInformation    OPTIONAL,  -- Need OP
    accessBarringForOriginatingCalls AccessClassBarringInformation    OPTIONAL,  -- Need OP
  } OPTIONAL,                                                                    -- Need OP
  radioResourceConfigCommon        RadioResourceConfigCommonSIB,
  ue-TimersAndConstants            UE-TimersAndConstants,
  frequencyInformation             SEQUENCE {
    ul-EARFCN                        INTEGER (0..maxEARFCN)           OPTIONAL,  -- Need OP
    ul-Bandwidth                     ENUMERATED {
                                       n6, n15, n25, n50, n75, n100, spare10,
                                       spare9, spare8, spare7, spare6, spare5,
                                       spare4, spare3, spare2, spare1} OPTIONAL, -- Need OP
    additionalSpectrumEmission       INTEGER (0..31)
  },
  ul-CyclicPrefixLength            ENUMERATED {len1,len2},
  mbsfn-SubframeConfiguration      MBSFN-SubframeConfiguration        OPTIONAL,  -- Need OP
  timeAlignmentTimerCommon         TimeAlignmentTimer,
  ...
}

AccessClassBarringInformation ::= SEQUENCE {
  accessProbabilityFactor          ENUMERATED {
                                     p00, p05, p10, p15, p20, p25, p30, p40,
                                     p50, p60, p70, p75, p80, p85, p90, p95},
  accessBarringTime                ENUMERATED {s4, s8, s16, s32, s64, s128, s256, s512},
  accessClassBarringList           AccessClassBarringList
}

AccessClassBarringList ::=       SEQUENCE (SIZE (maxAC)) OF SEQUENCE {
  accessClassBarring               BOOLEAN
}

MBSFN-SubframeConfiguration ::= SEQUENCE (SIZE (1..maxMBSFN-Allocations)) OF SEQUENCE {
  radioframeAllocationPeriod       ENUMERATED {n1, n2, n4, n8, n16, n32},
  radioframeAllocationOffset       INTEGER (0..7),
  subframeAllocation               INTEGER (1..6)
}
```

FIG. 6

```
UE-TimersAndConstants ::=   SEQUENCE {
    t300                    ENUMERATED {
                              ms100, ms200, ms400, ms600, ms1000, ms1500,
                              ms2000, spare1 },
    t301                    ENUMERATED {
                              ms100, ms200, ms400, ms600, ms1000, ms1500,
                              ms2000, spare1 },                            -- FFS, see eNote below
    t310                    ENUMERATED {
                              ms0, ms50, ms100, ms200, ms500, ms1000, ms2000,
                              spare1 },
    t311                    ENUMERATED {
                              ms1000, ms3000, ms5000, ms10000, spare4,
                              spare3, spare2, spare1 },
    ...
}
```

FIG. 7

```
RadioResourceConfigCommonSIB ::=    SEQUENCE {
    rach-Configuration              RACH-ConfigCommon,
    bcch-Configuration              BCCH-Configuration,
    pcch-Configuration              PCCH-Configuration,
    prach-Configuration             PRACH-ConfigurationSIB,
    pdsch-Configuration             PDSCH-ConfigCommon,
    pusch-Configuration             PUSCH-ConfigCommon,
    pucch-Configuration             PUCCH-ConfigCommon,
    soundingRsUl-Config             SoundingRsUl-ConfigCommon,
    uplinkPowerControl              UplinkPowerControlCommon,
    ...
}
```

FIG. 8

```
RRCConnectionReconfiguration ::=       SEQUENCE {
    rrc-TransactionIdentifier            RRC-TransactionIdentifier,
    criticalExtensions                   CHOICE {
        c1                               CHOICE {
            rrcConnectionReconfiguration-r8    RRCConnectionReconfiguration-r8-IEs,
            spare7 NULL,
            spare6 NULL,  spare5, NULL, spare4 NULL,
            spare3 NULL,  spare2, NULL, spare1 NULL
        },
        criticalExtensions               SEQUENCE {}
    }
}

RRCConnectionReconfiguration-r8-IEs ::= SEQUENCE {
    measurementConfiguration             MeasurementConfiguration           OPTIONAL,   -- Need OC
    mobilityControlInformation           MobilityControlInformation         OPTIONAL,   -- Need OP
    nas-DedicatedInformationList         SEQUENCE (SIZE (1..maxDRB)) OF
                                         NAS-DedicatedInformation           OPTIONAL,   -- Cond nonHO
    radioResourceConfiguration           RadioResourceConfigDedicated       OPTIONAL,   -- Need OC
    securityConfiguration                SecurityConfiguration              OPTIONAL,   -- Cond HOSec
    ue-RelatedInformation                UE-RelatedInformation              OPTIONAL,   -- Cond HO
    nonCriticalExtension                 SEQUENCE {}                        OPTIONAL    -- Need OP
}
```

FIG. 9

```
MobilityControlInformation ::=    SEQUENCE {
    targetCellIdentity            PhysicalCellIdentity,
    eutra-CarrierFreq             EUTRA-CarrierFreq                OPTIONAL,   -- Need OP
    eutra-CarrierBandwidth        EUTRA-CarrierBandwidth           OPTIONAL,   -- Need OP
    additionalSpectrumEmission    INTEGER (0 .. 31)                OPTIONAL,   -- Need OC
    pmax                          Pmax                             OPTIONAL,   -- Need FFS
    t304                          ENUMERATED {
                                      ms50, ms100, ms150, ms200, ms500, ms1000,
                                      ms2000, spare1 },
    radioResourceConfigCommon     RadioResourceConfigCommon,
    rach-ConfigDedicated          RACH-ConfigDedicated             OPTIONAL    -- Need FFS
    ...
}

EURTA-CarrierBandwidth ::=  SEQUENCE {
    dl-Bandwidth    ENUMERATED { ffs }    OPTIONAL,   -- Need OP, 4-bit field FFS
    ul-Bandwidth    ENUMERATED { ffs }    OPTIONAL    -- Need OP, 4-bit field FFS
}
```

FIG. 10

```
RadioResourceConfigCommon ::=    SEQUENCE {
    rach-Configuration              RACH-ConfigCommon,
    prach-Configuration             PRACH-Configuration,
    pdsch-Configuration             PDSCH-ConfigCommon,
    pusch-Configuration             PUSCH-ConfigCommon,
    phich-Configuration             PHICH-Configuration,
    pucch-Configuration             PUCCH-ConfigCommon,
    soundingRsUl-Config             SoundingRsUl-ConfigCommon,
    uplinkPowerControl              UplinkPowerControlCommon     OPTIONAL,   -- Need OC
    antennaInformationCommon        AntennaInformationCommon
    tdd-Configuration               TDD-Configuration            OPTIONAL,   -- Need OC
                                                                 OPTIONAL,   -- Need OC ...                                                          OPTIONAL,   -- Need OC
                                                                 OPTIONAL,   -- Need OC
                                                                 OPTIONAL,   -- Need OC
}

BCCH-Configuration ::=           SEQUENCE {
    modificationPeriodCoeff         ENUMERATED { n2, n4, n8, spare }
}

PCCH-Configuration ::=           SEQUENCE {
    defaultPagingCycle              ENUMERATED {
                                        rf32, rf64, rf128, rf256 },
    nB                              ENUMERATED {
                                        fourT, twoT, oneT, halfT, quarterT, oneEightT,
                                        oneSixteenthT, oneThirtySecondT }
}
```

MOBILE STATION AND MOBILE COMMUNICATION METHOD

TECHNICAL FIELD

The present invention relates to a mobile station and a mobile communication method.

BACKGROUND ART

In mobile communication systems of the LTE (Long Term Evolution) scheme standardized in the 3GPP, a radio base station eNB is configured to transmit broadcast information which includes, for example, a MIB (Master Information Block) and a SIB 1 (System Information Block 1) in a subordinate cell, and a mobile station UE in that cell is configured to perform predetermined communication in accordance with, for example, information in the MIS and the SIB 1 included in the broadcast information.

SUMMARY OF THE INVENTION

Problems to be Solved by the Invention

However, in the existing mobile communication systems of the LTE scheme, there is a problem that the mobile station UE cannot continue communication in the second cell, when the mobile station UE fails to receive, for example, the SIB 1 in the second cell, and when the mobile station UE performs a handover from the first cell to the second cell.

The present invention has been made in view of the above-described problem and an object thereof is to provide a mobile station and a mobile communication method capable of continuing communication in the second cell, even if the mobile station fails to receive broadcast information in the second cell, and when the mobile station performs a handover from the first cell to the second cell.

Means for Solving the Problem

A first aspect of the present invention is summarized as a mobile station including: a broadcast information reception unit configured to receive a master information block included in broadcast information in a second cell, and to receive a first system information block included in the broadcast information based on information included in the master information block, when the mobile station performs a handover from a first cell to the second cell in response to a received handover command; and a communication unit configured to start a first communication using information included in the master information block, the first system information block and the handover command in the second cell when the broadcast information reception unit succeeds in receiving the first system information block, and to perform a second communication using information included in the master information block and the handover command in the second cell when the broadcast information reception unit fails to receive the first system information block.

A second aspect of the present invention is summarized as a mobile communication method including the steps of: receiving, at a mobile station, a master information block included in broadcast information in a second cell, and receiving, at the mobile station, a first system information block included in the broadcast information based on information included in the master information block, when the mobile station performs a handover from a first cell to the second cell in response to a received handover command; starting, at the mobile station, a first communication using information included in the master information block, the first system information block and the handover command in the second cell, when the mobile station succeeds in receiving the first system information block; and performing, at the mobile station, a second communication using information included in the master information block and the handover command in the second cell, when the mobile station fails to receive the first system information block.

Effect of the Invention

As described above, according to the present invention, a mobile station and a mobile communication method capable of continuing communication in the second cell, even if the mobile station fails to receive broadcast information in the second cell, and when the mobile station performs a handover from the first cell to the second cell can be provided.

BRIEF DESCRIPTION OF THE DRAWINGS

FIG. 3 is a diagram illustrating example of broadcast information (MIB) transmitted by a radio base station according to the first embodiment of the present invention.

FIG. 4 is a diagram illustrating example of broadcast information (SIB 1) transmitted by the radio base station according to the first embodiment of the present invention.

FIG. 5 is a diagram illustrating example of broadcast information (SIB 2) transmitted by the radio base station according to the first embodiment of the present invention.

FIG. 6 is a diagram illustrating an example of information element (uE-TimersAndConstants) included in the broadcast information (SIB 2) transmitted by the radio base station according to the first embodiment of the present invention.

FIG. 7 is a diagram illustrating an example of information element (radioResourceConfigCommon) included in the broadcast information (SIB 2) transmitted by the radio base station according to the first embodiment of the present invention.

FIG. 8 is a diagram illustrating content of the information element (radioResourceConfigCommon) included in the broadcast information (SIB 2) transmitted by the radio base station according to the first embodiment of the present invention.

FIG. 9 is a diagram illustrating the content of the information element (radioResourceConfigCommon) included in the broadcast information (SIB 2) transmitted by the radio base station according to the first embodiment of the present invention.

FIG. 10 is a diagram illustrating the content of the information element (radioResourceConfigCommon) included in the broadcast information (SIB 2) transmitted by the radio base station according to the first embodiment of the present invention.

BEST MODES FOR CARRYING OUT THE INVENTION (Configuration of the Mobile Communication System According to the First Embodiment of the Present Invention)

With reference to FIGS. 1 to 10, a configuration of a mobile communication system according to the first embodiment of the present invention will be described.

Figure 1:
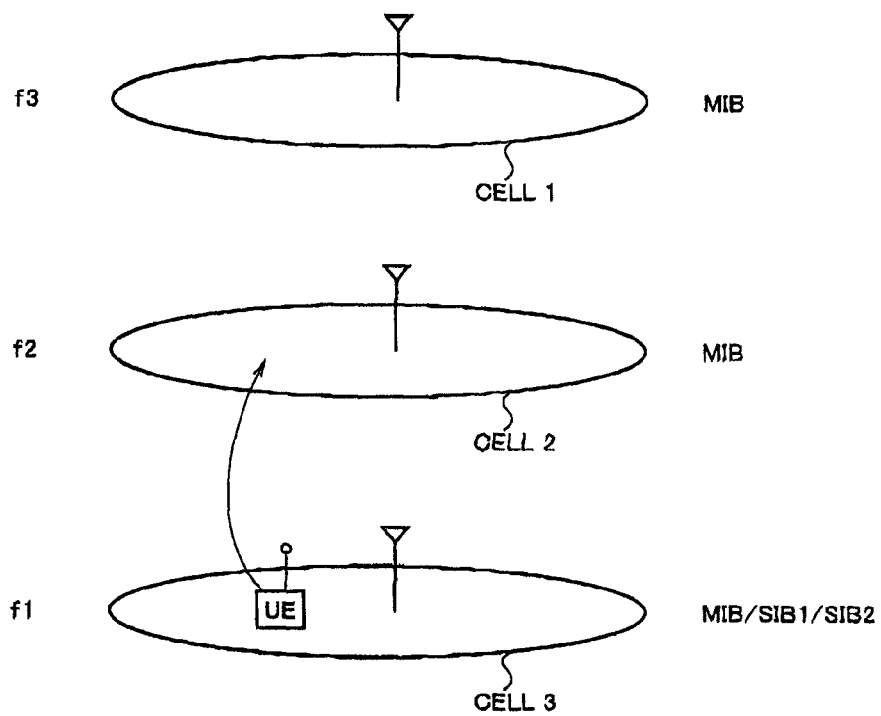
FIG. 1 is a diagram of an entire configuration of a mobile communication system according to a first embodiment of the present invention.

As illustrated in FIG. 1, the mobile communication system according to the present embodiment is an mobile communication system of the LTE scheme which includes a cell 1 in which a frequency f1 is used, a cell 2 in which a frequency f2 is used and a cell 3 in which a frequency f3 is used.

Here, as illustrated in FIG. 1, a MIB, a SIB 1 and a SIB 2 are included in broadcast information transmitted in the cell 1, while the SIB 1 and the SIB 2 are not included in broadcast information transmitted in the cell 2 and the cell 3.

Hereinafter, in the present embodiment, an example in which a mobile station UE performs a handover from the cell 1 (a first cell) to the cell 2 (a second cell) will be described.

Figure 2:
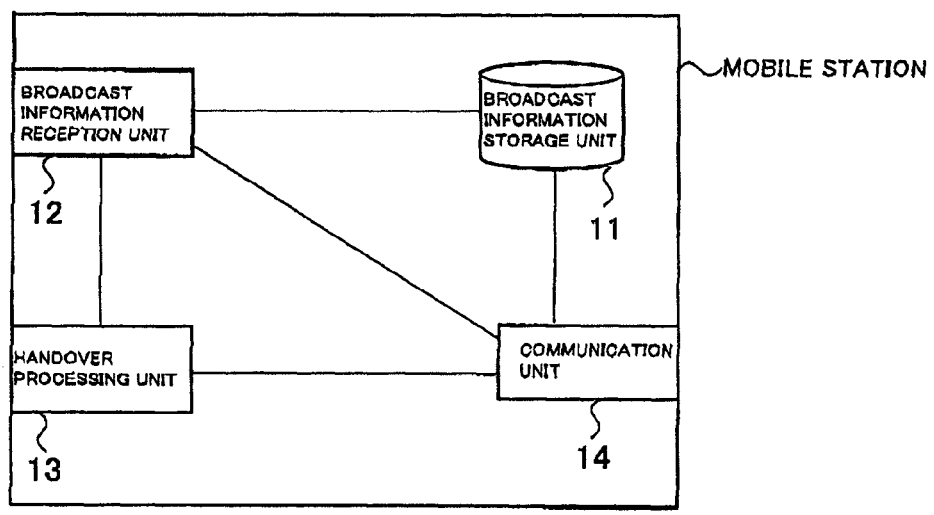
FIG. 2 is a functional block diagram of a mobile station according to the first embodiment of the present invention.

As illustrated in FIG. 2, the mobile station UE includes a broadcast information storage unit 11, a broadcast information reception unit 12, a handover processing unit 13 and a communication unit 14.

The broadcast information storage unit 11 is configured to store broadcast information which is received by the broadcast information storage unit 11.

Here, the broadcast information storage unit 11 may also be configured to store both the broadcast information received by the broadcast information storage unit 11 in the cell 1 which is a cell in which the mobile station UE is located before the handover is performed, and the broadcast information received by the broadcast information storage unit 11 in the cell 2 which is a cell in which the mobile station UE is located after the handover is performed.

The broadcast information reception unit 12 is configured to receive broadcast information (for example, the MIB, the SIB 1 and the SIB 2) transmitted in the cell which the mobile station UE is visiting, and store the received broadcast information in the broadcast information storage unit 11.

In particular, the broadcast information reception unit 12 is configured to receive the MIB included in the broadcast information in the cell 2, and to receive the SIB 1 included in the broadcast information in accordance with the information included in the MIB, when the mobile station LIE performs a handover from the cell 1 to the cell 2.

For example, as illustrated in FIG. 3, the broadcast information reception unit 12 is configured to receive, for example, "dl-SystemBandwidth", "phich-Configuration" and "systemFrameNumber" which are the information included in the MIB.

Here, the "dl-SystemBandwidth" is information representing a frequency band used in a downlink of the mobile communication system; the "phich-Configuration" is setting information of PHICH (Physical HARQ Indicator Channel); and the "systemFrameNumber" is information representing a system frame number in the mobile communication system.

As illustrated in FIG. 4, the broadcast information reception unit 12 is also configured to receive, for example, "plmn-IdentityList", "trackingAreaCode" and "schedulingInformation" which are information included in the SIB 1.

Here, the "plmn-IdentityList" and the "trackingAreaCode" are information which are not included in a handover command, but are the information used in a location registration process (TAU) performed when the mobile station UE is in a "RRC-Connected state (connection state)".

The "schedulingInformation" is information representing scheduling information (cycle information and mapping information) of a plurality of SI (System Information).

As illustrates FIG. 5, the broadcast information reception unit 12 is configured to receive, for example, "ue-TimersAndConstants", a "radioResourceConfigCommon" and "mbsfn-subframeConfiguration" which are information included in the SIB 2.

Here, the "mbsfn-SubframeConfiguration" represents setting information for the reception of information for the MBMS (Multimedia Broadcast Multicast Service) of the LTE scheme in that cell.

The setting information includes, for example, setting information about a location of a subframe allocated for the "MBSFN (MBMS Single Frequency Network) transmission scheme" in which the same information is simultaneously transmitted from a plurality of cells using the same frequency resource.

The mobile station UE applies, in a subframe to which the MBSFN transmission is applied, a channel estimation value that is different from a channel estimation value in a subframe to which the MBSFN transmission scheme is not applied.

That is, in the subframe to which the MBSFN transmission scheme is not applied, a pilot signal dedicated for each cell is used for the identification of the cells. Accordingly, the mobile station UE performs channel estimation to the cell in accordance with the pilot signal dedicated for each cell.

On the contrary, in the subframe to which the MBSFN transmission scheme is applied, since the identical pilot signal is transmitted from a plurality of radio base stations eNB, it is impossible to perform channel estimation to individual cells. Channel estimation for the MBSFN reception is performed in that subframe.

In the subframe to which the MBSFN transmission scheme is applied, it can be considered that the mobile station UE is not performing a unicast transmission.

Thus, in the subframe to which the MBSFN transmission scheme is applied, the mobile station UE can perform an operation that is different from an operation in the subframe to which the MBSFN transmission scheme is not applied.

The "ue-TimersAndConstants" is information representing setting values of various timers used in the cell. For example, as illustrated in FIG. 6, the "ue-TimersAndConstants" is information representing a setting value of a timer T300, a setting value of a timer T301, a setting value of a timer T310, a setting value of a timer T311, and so on.

The "radioResourceConfigCommon" includes, as illustrated in FIG. 7, "rach-Configuration" which is setting information of a RACH (Random Access Channel), "bcch-Configuration" which is setting information of a BCCH (Broadcast Channel), "pcch-Configuration" which is setting information of a PCCH (Paging Control Channel), "prach-Configuration" which is setting information of a PRACH (Physical Random Access Channel), "pdsch-Configuration" which is setting information of a PDSCH (Physical Downlink Shared Channel), "pusch-Configuration" which is setting information of a PUSCH (Physical Uplink Shared Channel), "pucch-Configuration" which is setting information of a PUCCH (Physical Uplink Control Channel), and so on.

For example, it is configured that information, which is set in the "radioResourceConfigCommon" which is an information element included in the "MobilityControlInformation" (see FIG. 9) which is an information element included in the "RRCConnectionReconfiguration" (see FIG. 8) which is an information element transmitted in a dedicated channel, is set in the "pcch-Configuration" (see FIG. 10).

In particular, as illustrated in FIG. 10, it is configured that "defaultPagingCycle" representing a paging cycle and "nB" representing a setting value of a parameter nB are set in the "pcch-Configuration".

The broadcast information reception unit 12 may also be configured not to perform a reception process with respect to the SIB 1, when it is reported by the MIB that the SIB 1 is not transmitted in the cell 2. Such a report may be configured to be made, for example, by 1 bit in the MIB.

The broadcast information reception unit 12 may also be configured not to perform a reception process with respect to the SIB 1, when it is reported by the handover command that the SIB 1 is not transmitted in the cell 2. Such a report may be configured to be made, for example, by 1 bit in the handover command.

The handover processing unit 13 is configured to perform a process in which the mobile station UE performs a handover from the cell 1 to the cell 2 in response to the handover command received from the radio base station eNB.

Here, the handover command may be configured to include information transmitted by the SIB 1 and the SIB 2 necessary for the operation in the "RRC-Connected state (connection state)" after the handover, preparing for the case that the broadcast information reception unit 12 fails to receive the SIB 1 and the SIB 2.

Such information is assumed to be, for example, the "plmn-IdentityList", "trackingAreaCode", "ue-TimersAndConstants", "pcch-Configuration" and "mbsfn-SubframeConfiguration".

The communication unit 14 is configured to perform predetermined communication in the cell 2, when the mobile station UE performs a handover from the cell 1 to the cell 2.

In particular, the communication unit 14 is configured to start first communication in the cell 2 using information included in the MIB, the SIB 1 and the handover command, when the broadcast information reception unit 12 succeeds in receiving the SIB 1 and the SIB 2.

The communication unit 14 is configured to perform second communication in the cell 2 using information included in the MIB and the handover command, when, on the contrary, the broadcast information reception unit 12 fails to receive the SIB 1 and the SIB 2.

For example, the communication unit 14 may be configured to perform a regular location registration process in accordance with the information "plmn-IdentityList" and "trackingAreaCode" which are included in the SIB 1, when the communication unit 14 is performing the first communication.

On the contrary, the communication unit 14 may be configured not to perform a location registration process, since the information "plmn-IdentityList" and "trackingAreaCode" included in the SIB 1 cannot be acquired when the communication unit 14 is performing the second communication. When it is set to perform the location registration process regularly, the communication unit 14 may be configured not to perform a regular location registration process.

The communication unit 14 may be configured to use a timer setting value included in the SIB 1 (a timer setting value included in the "ue-TimersAndConstants") when performing the first communication, and to use the timer setting value used in the cell 1 when performing the second communication.

The communication unit 14 may be configured to receive a paging signal addressed to the mobile station UE in accordance with the information "pcch-Configuration" included in the SIB 1 when performing the first communication. And, the communication unit 14 may be configured not to receive a paging signal addressed to the mobile station UE, since the information "pcch-Configuration" included in the SIB 1 cannot be acquired when the communication unit 14 is performing the second communication.

Alternatively, the communication unit 14 may be configured to receive a paging signal addressed to the mobile station UE in accordance with the information "pcch-Configuration" included in the SIB 1 when performing the first communication. And, the communication unit 14 may be configured to receive a paging signal addressed to the mobile station UE in accordance with the information "pcch-Configuration" used in the cell 1, since the information "pcch-Configuration" included in the SIB 1 cannot be acquired in the cell 2 when the communication unit 14 is performing the second communication.

Further, the communication unit 14 may be configured to consider a predetermined subframe as a subframe to which the MBSFN transmission scheme is applied in accordance with the information "mbsfn-SubframeConfiguration" included in the SIB1 when performing the first communication. And, the communication unit 14 may be configured to consider the predetermined subframe as a subframe to which the MBSFN scheme is not applied, since the information "mbsfn-SubframeConfiguration" included in the SIB 1 cannot be acquired in the cell 2 when the communication unit 14 is performing the second communication.

Alternatively, the communication unit 14 may be configured to consider a predetermined subframe as a subframe to which the MBSFN scheme is applied in accordance with the information "mbsfn-SubframeConfiguration" included in the SIB1 when performing the first communication. And, the communication unit 14 may be configured to consider the predetermined subframe as a subframe to which the MBSFN scheme is applied in accordance with the "mbsfn-SubframeConfiguration" used in the cell 1, since the information "mbsfn-SubframeConfiguration" included in the SIB 1 cannot be acquired in the cell 2 when the communication unit 14 is performing the second communication.

(Operation of the Mobile Communication System According to the First Embodiment of the Present Invention)

Figure 11:
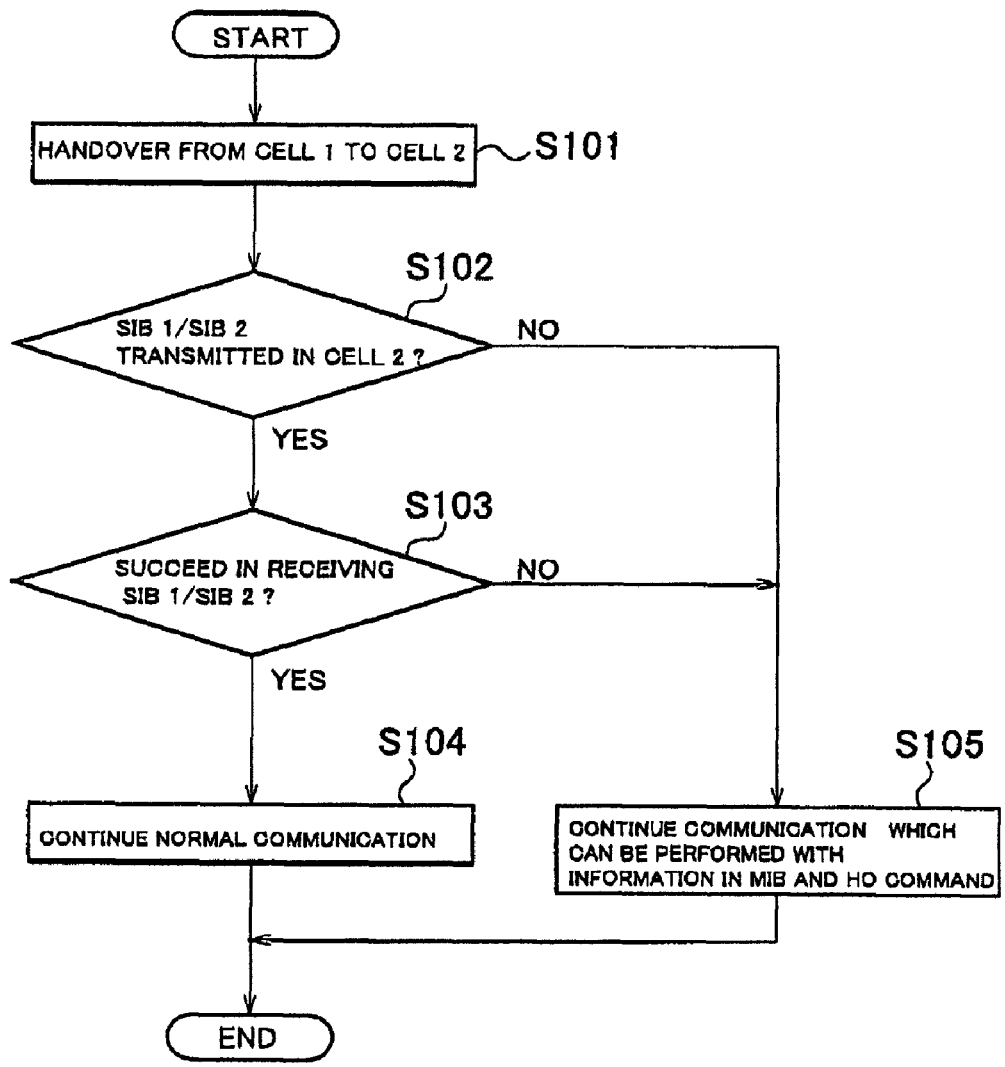
FIG. 11 is a flowchart illustrating an operation of the mobile station according to the first embodiment of the present invention.

With reference to FIG. 11, an operation of the mobile communication system according to the first embodiment of the present invention, that is, in particular, an operation of the mobile station UE used in the mobile communication system according to the first embodiment of the present invention will be described.

As illustrated in FIG. 11, in step S101, a handover of the mobile station UE is performed from the cell 1 to the cell 2.

In step S102, the mobile station UE determines whether or not the SIB 1/SIB 2 are transmitted within the broadcast information in the cell 2 in accordance with a predetermined flag in the MIB or the handover command.

When it is determined that the SIB 1/SIB 2 are transmitted, the operation proceeds to step S103 and, when it is determined that the SIB 1/SIB 2 are not transmitted, the operation proceeds to step S105.

In step S103, the mobile station UE performs a reception process with respect to the SIB 1/SIB 2. When the mobile station UE succeeds in performing the reception process, the operation proceeds to step S104 and, when the mobile station UE fails to perform the reception process, the operation proceeds to step S105.

In step S104, the mobile station UE continues the first communication (normal communication) in the cell 2 using the information included in the MIS, the SIB 1, the SIB 2 and the handover command.

On the contrary, in step S105, the mobile station UE continues the second communication (communication which can be performed with the information included in the MIB and the handover command) in the cell 2 using the information included in the MIB and the handover command.

(Operation and Effect of the Mobile Communication System According to the First Embodiment of the Present Invention)

According to the mobile communication system according to the first embodiment of the present invention, continuity in communication can be guaranteed, because the mobile station UE can continue the second communication using the information included in the MIB and the handover command, even if the mobile station UE fails to receive the SIB 1/SIB 2 in the cell to which the mobile station US performs a handover.

According to the mobile communication system according to the first embodiment of the present invention, the design of the cell can be provided with flexibility, because it is not necessary that each cell transmits the SIB 1 and the SIB 2.

For example, the following operation can be performed: the mobile station UE in an "idle state (Idle-Mode)" camps on only in the cell 1 in which the SIB 1 and the SIB 2 are transmitted, and the mobile station UE in a "RRC-Connected state (connection state, Connected-Mode)" performs communication both in the cell 1, and in the cells 2 in which the SIB 1 and the SIB 2 are not transmitted.

With this, it is possible to reduce the number of times of cell reselection between different frequencies, when the mobile station UE is in the "idle state". Paging load can also be reduced.

According to the mobile communication system according to the first embodiment of the present invention, time required for a handover process can be reduced, because the mobile station UE can detect that the SIB 1/SIB 2 is not transmitted in a specific cell, and, in this case, can start communication without performing any reception process with respect to the SIB 1/SIB 2.

The characteristics of the present embodiment described above may be expressed in the following manner.

A first aspect of the present embodiment is summarized as a mobile station UE which includes; a broadcast information reception unit 12 configured to receive a MIB included in broadcast information in a cell 2, and to receive a SIB 1 included in the broadcast information based on information included in the MIB, when the mobile station UE performs a handover from a cell 1 to the cell 2 in response to a handover command; and a communication unit 14 configured to start first communication in the cell 2 using information included in the MIB, the SIB 1 and the handover command when the broadcast information reception unit 12 succeeds in receiving the SIB 1, and to perform second communication in the cell 2 using information included in the MIB and the handover command when the broadcast information reception unit 12 fails to receive the SIB 1.

In the first aspect of the present embodiment, the communication unit 14 may be configured to perform a location registration process based on information included in the SIB 1 when performing the first communication, and not to perform the location registration process when performing the second communication. A regular location registration process may be included in the location registration process.

In the first aspect of the present embodiment, the communication unit 14 may be configured to use a timer setting value included in the SIB 1 when performing the first communication, and to use the timer setting value used in the cell 1 when performing the second communication.

In the first aspect of the present embodiment, the communication unit 14 may be configured to receive a paging signal addressed to the mobile station UE based on the information included in the SIB 1 when performing the first communication, and not to receive the paging signal addressed to the mobile station UE when performing the second communication.

In the first aspect of the present embodiment, the communication unit 14 may be configured to receive a paging signal addressed to the mobile station UE based on the information included in the SIB 1 when performing the first communication, and to receive the paging signal addressed to the mobile station UE based on the information used in the cell 1 when performing the second communication.

In the first aspect of the present embodiment, the communication unit 14 is configured to consider a predetermined subframe as a subframe to which the MBSFN transmission scheme is applied based on the information included in the SIB 1 when performing the first communication, and to consider the predetermined subframe as a subframe to which the MBSFN transmission scheme is not applied when performing the second communication.

In the first aspect of the present embodiment, the communication unit 14 is configured to consider a predetermined subframe as a subframe to which the MBSFN transmission scheme is applied based on the information included in the SIB 1 when performing the first communication, and to consider the predetermined subframe as a subframe applied to which the MBSFN transmission scheme is applied based on the information in the cell 1 when performing the second communication.

In the first aspect of the present embodiment, the broadcast information reception unit 12 may be configured not to perform a reception process with respect to the SIB 1, when it is reported by the MIB that the SIB 1 is not transmitted in the cell 2.

In, the first aspect of the present embodiment, the broadcast information reception unit 12 may be configured not to perform a reception process with respect to the SIB 1 when it is reported by the handover command that the SIB 1 is not transmitted in the cell 2.

A second aspect of the present embodiment is summarized as a mobile communication method, which includes the steps of: receiving, at a mobile station UE, a MIB included in broadcast information in a cell 2, and receiving, at the mobile station UE, a SIB 1 included in the broadcast information based on information included in the MIB, when the mobile station UE performs a handover from a cell 1 to the cell 2 in response to a received handover command; starting, at the mobile station UE, a first communication using information included in the MIB, the SIB 1 and the handover command in the cell 2, when the mobile station UE succeeds in receiving the SIB 1; and performing, at the mobile station UE, a second communication using information included in the MIB and the handover command in the cell 2, when the mobile station UE fails to receive the SIB 1.

Note that operation of the above described mobile station UE and the radio base station eNB may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE and the radio base station eNB. Also, the storage medium and the processor may be provided in the mobile station UE and the radio base station eNB as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile station comprising:
a broadcast information reception unit configured to receive a master information block included in broadcast information in a second cell, and to receive a first system information block included in the broadcast information based on information included in the master information block, when the mobile station performs a handover from a first cell to the second cell in response to a received handover command; and
a communication unit configured to perform a first communication using information included in the master information block, the first system information block and the handover command in the second cell when the broadcast information reception unit receives the first system information block, and to perform a second communication using information included in the master information block and the handover command in the second cell when the broadcast information reception unit does not receive the first system information block, wherein
the communication unit is configured to perform a location registration process based on information included in the first system information block when performing the first communication, and not to perform the location registration process when performing the second communication.

2. The mobile station according to claim 1, wherein
the communication unit is configured to receive a paging signal addressed to the mobile station based on information included in the first system information block when performing the first communication, and not to receive the paging signal addressed to the mobile station when performing the second communication.

3. The mobile station according to claim 1, wherein
the communication unit is configured to consider a predetermined subframe as a subframe to which a MBSFN transmission scheme is applied based on information included in the first system information block when performing the first communication, and to consider the predetermined subframe as a subframe to which the MBSFN transmission scheme is not applied when performing the second communication.

4. A mobile communication method comprising the steps of:
(A) receiving, at a mobile station, a master information block included in broadcast information in a second cell, and receiving, at the mobile station, a first system information block included in the broadcast information based on information included in the master information block, when the mobile station performs a handover from a first cell to the second cell in response to a received handover command;
(b) performing, at the mobile station, a first communication using information included in the master information block, the first system information block and the handover command in the second cell, when the mobile station receives the first system information block; and
(C) performing, at the mobile station, a second communication using information included in the master information block and the handover command in the second cell, when the mobile station does not receive the first system information block, wherein
in the step (B), the mobile station performs a location registration process based on information included in the first system information block when performing the first communication, and
in the step (C), the mobile station does not perform the location registration process when performing the second communication.

5. The mobile communication method according to claim 4, wherein
in the step (B), the mobile station receives a paging signal addressed to the mobile station based on information included in the first system information block when performing the first communication, and
in the step (C), the mobile station does not receive the paging signal addressed to the mobile station when performing the second communication.

6. The mobile communication method according to claim 4, wherein
in the step (B), the mobile station considers a predetermined subframe as a subframe to which a MBSFN transmission scheme is applied based on information included in the first system information block when performing the first communication, and
in the step (C), the mobile station considers the predetermined subframe as a subframe to which the MBSFN transmission scheme is not applied when performing the second communication.

* * * * *